W. O. BECK.
CASING AND SUPPORT FOR ELECTRICAL APPARATUS.
APPLICATION FILED NOV. 24, 1917.

1,343,880.

Patented June 15, 1920.
2 SHEETS—SHEET 1.

Inventor:
William O. Beck.
by J. G. Roberts Att'y.

W. O. BECK.
CASING AND SUPPORT FOR ELECTRICAL APPARATUS.
APPLICATION FILED NOV. 24, 1917.

1,343,880.

Patented June 15, 1920.
2 SHEETS—SHEET 2.

Inventor:
William O. Beck.
by J.G. Roberts
Att'y.

UNITED STATES PATENT OFFICE.

WILLIAM O. BECK, OF RIDGEFIELD, NEW JERSEY, ASSIGNOR TO WESTERN ELECTRIC COMPANY, INCORPORATED, OF NEW YORK, N. Y., A CORPORATION OF NEW YORK.

CASING AND SUPPORT FOR ELECTRICAL APPARATUS.

1,343,880.    Specification of Letters Patent.    Patented June 15, 1920.

Application filed November 24, 1917. Serial No. 203,784.

*To all whom it may concern:*

Be it known that I, WILLIAM O. BECK, a citizen of the United States, residing at Ridgefield, in the county of Bergen and State of New Jersey, have invented certain new and useful Improvements in Casings and Supports for Electrical Apparatus, of which the following is a full, clear, concise, and exact description.

This invention relates to casings and supports for electrical apparatus, and has for its object the production of structures of few and simple parts of light materials, fabricated to provide the required strength and capable of being assembled in various combinations.

One feature of the invention resides in the provision of a support for electrical apparatus produced from comparatively light material, of openings therein to permit the passage therethrough of various combinations of terminals for the apparatus, of means for insulating the apparatus and terminals from the support, and of means for guiding an inclosing cover over the apparatus and securing the cover in position.

Another feature resides in the structural arrangements of the guiding and retaining means for the protective covers and in their application to the apparatus to be protected.

Supports and casings made in accordance with this invention are particularly adapted for the purpose of mounting and inclosing relays and similar apparatus used in telephone and telegraph systems.

Heretofore it has been the practice to use heavy steel plates for the purpose of supporting apparatus of this character, and to drill holes through the plates for the various terminals. Furthermore, the various mounting positions on the plates have each been drilled to accommodate relays having particular terminal arrangements, and in cases where it has been necessary to support on the same plate relays having different terminal arrangements, such plates have been special and their production has involved considerable expense.

By means of this invention a support is provided which is universal in character and capable of accommodating a number of relays made up in a variety of forms, and which relays may be interchanged from one position to another without regard to the particular form. Furthermore, the supports themselves are constructed of thin material punched from sheet stock. The openings through the support, for the passage of the terminals, are also made by a punching instead of a drilling operation. Additional strength, if required, is obtained by forming a web along the edge of the support.

The invention will be more clearly understood by reference to the accompanying drawings in which—

Fig. 3 is a view showing in detail an individual relay provided with means for supporting and retaining the inclosing cover.

Figure 1:
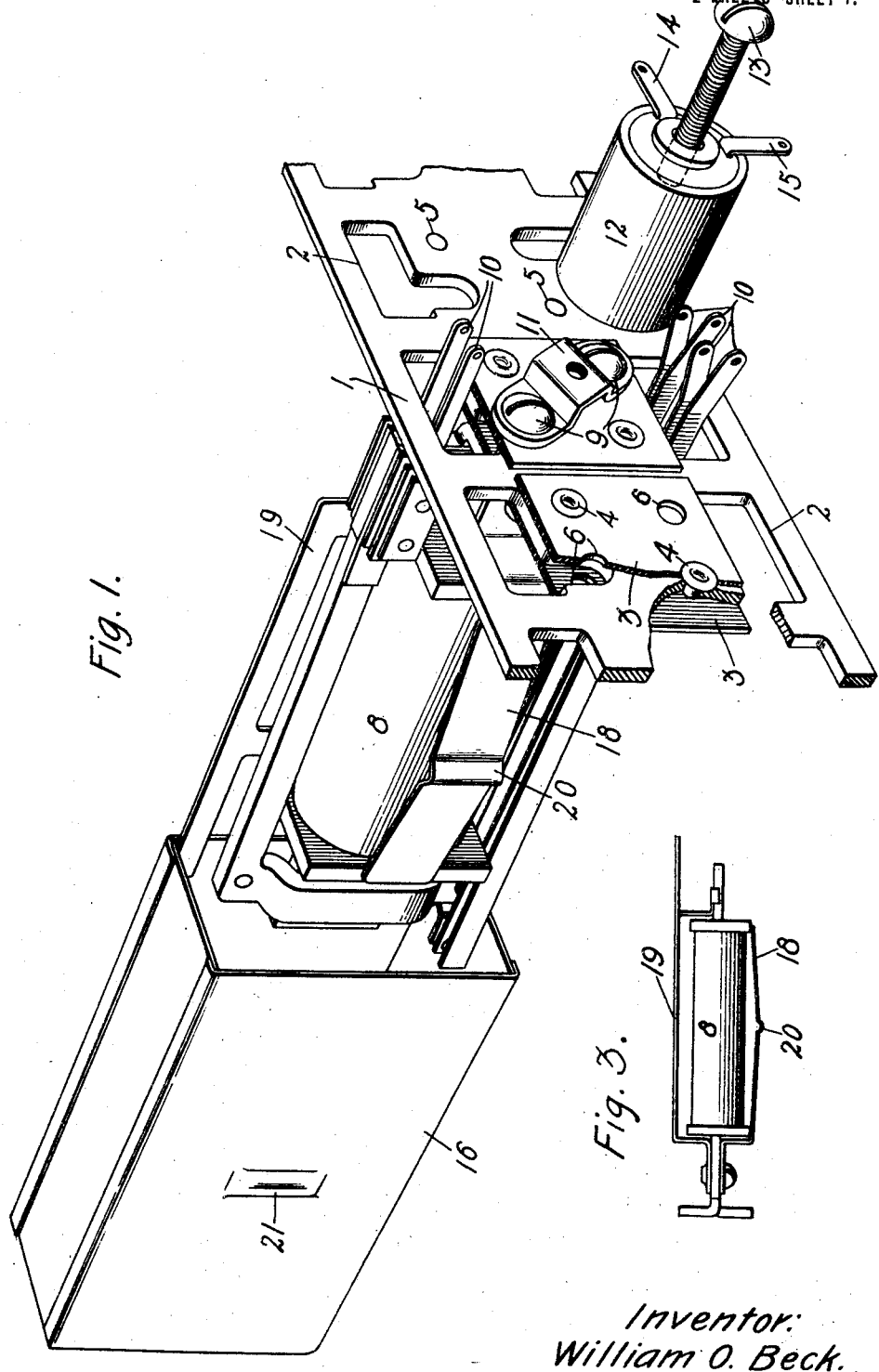
Figure 1 is a perspective view partially in section showing a support for a relay, and in addition the support and guide for the inclosing casing carried by the relay.

As shown in the drawings, there is provided a supporting plate 1 having irregular shaped openings 2 therein. Rectangular pieces of insulating material 3, produced from sheet stock, are mounted on opposite surfaces of the supporting plate and held in position by hollow rivets 4 extending through additional openings 5 in the plate. The insulating pieces 3 are mounted on the plate 1 in such positions that portions of the irregular shaped openings 2 are covered, leaving a rectangular shaped clear way through the plate. Additional openings 6 in the pieces of insulation register with a portion of the irregular shaped openings 2 in the plate 1, but the openings 6 are smaller than the openings through the plate with which they register. These additional openings 6 are for the passage of the screws used to secure the relays or other apparatus to the plate, as will be described later, and the difference between the size of the openings 6 and the portions of openings 2 with which they register prevents the screws from making contact with the plate 1, and holds the said screws and plate in insulated relation to each other.

Figure 2:
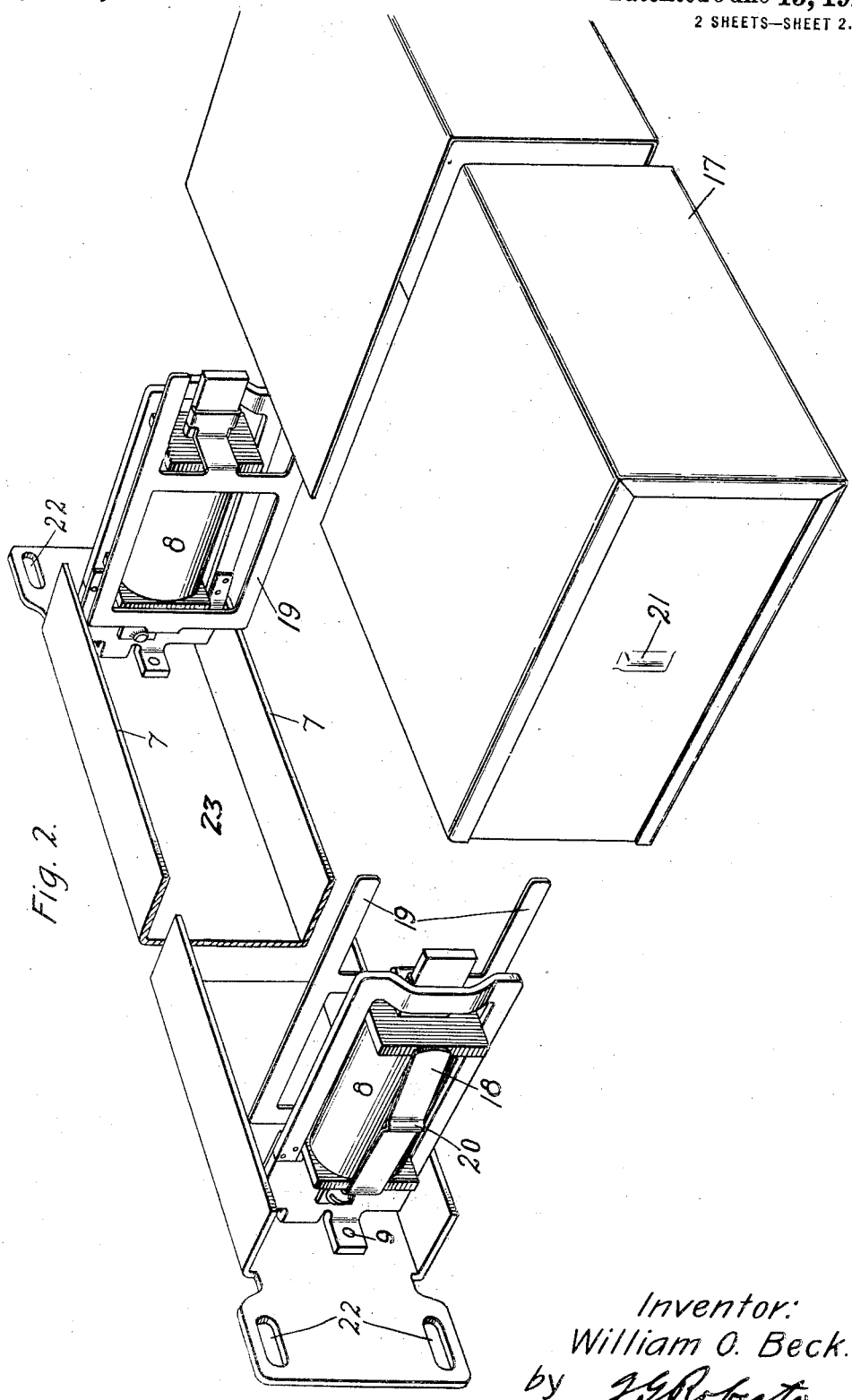
Fig. 2 is a perspective view of a support adapted to serve as a mounting for a number of relays and provided with means for supporting a cover common to all the relays.

The plates 1 and 23, shown in Figs. 1 and 2, are particularly adapted for supporting relays of the type shown in United States Patents 1,121,897 and 1,156,671, issued December 22, 1914 and October 12, 1916, respectively, to E. B. Craft. These plates may, however, be readily adapted for mounting relays of other types. A detailed description of the relays is not considered necessary here, in view of the showing in the patents hereinbefore mentioned.

The plate 23 shown in Fig. 2, differs slightly from that shown in Fig. 1, in that webs 7 are formed along the edges to provide additional strength.

The relays 8 are mounted adjacent to each other and on one side only of the plates 1 and 23. They are secured in place by means of screws 9 passing through the insulators 3 by way of the openings 6. The terminals 10 extend through the plates by way of the openings 2 and project beyond the opposite side of the plates.

In Fig. 1 there is shown a small bracket 11 also secured in position by the screws 9. This bracket serves as an auxiliary support for additional apparatus such as the resistance coil 12 shown in Fig. 1, which coil is secured to the bracket 11, by means of the screw 13. The windings of this coil are connected to terminals 14 and 15.

In Fig. 1 there is shown an inclosing cover 16 individual to the relay 8. In Fig. 2 the cover 17 is shown as being common to a number of relays.

Two elements 18 and 19 are secured to relay 8, Fig. 1, which serve to guide the cover 16 over the relay and to retain it in place. These elements are arranged to lie parallel with the relay and to extend outward from plate 1. The element 19 is of substantially the same width as one inside dimension of the cover, and serves to guide the cover into position. It also prevents the cover from disturbing the contact spring of the relay.

One end of element 18 engages a spool head of the relay coil and being bowed in the center exerts a slight tension against the surface of one of the inner walls of the cover, due to its spring action.

The cover is held in normal position over the relay by the engagement of a projection 20 on element 18 with a depression 21 formed in the cover wall.

Fig. 3 shows in detail the method used in attaching elements 18 and 19 to the frame of the relay, and the position normally occupied by such elements.

In Fig. 2 there are shown two relays mounted at the ends of the plate 23, and a cover common to the two relays shown is adapted to be held in position by two elements 18 carried by the relays. The elements 19 serve to guide the cover to its seat and also prevent the cover from disturbing the contact springs. It is to be understood that additional relays may be mounted on this plate in the intermediate positions, but such relays would not be provided with elements 18, and elements 19 would be provided only as required. In Fig. 2, the web formed on the edge of the plate also serves to a certain extent as a guide for the cover. The projections 20 on elements 18, and the depressions 21 in the end walls of the cover serve to hold the cover in position as in the case of the covers for the individual relays shown in Fig. 1.

In the plate 23, of Fig. 2, there are shown openings 22 for the passage of bolts or screws for securing the plate 1 to a support in a switchboard or mounting rack.

By means of the construction shown in the drawings, there is provided an arrangement of elements capable of being easily produced in large quantities from sheet stock, and which elements are more or less interchangeable. This construction permits relays or other similar apparatus of the same general type but of varying characteristics as to contact spring combinations, to be mounted indiscriminately on a common support. The apparatus may be protected either by common or individual covers, and if desired, certain pieces of the apparatus may be inclosed by individual covers or any number of pieces of adjacent apparatus may be inclosed in a cover common to the group.

What is claimed is:

1. A mounting for relays and the like comprising a supporting element having openings therein, members carried by said element provided with means to hold relays having various terminal arrangements, said members adjustable to position the terminals of the relays in registry with the openings in the supporting element, and a cover coöperating with said supporting element to inclose the relays carried thereby.

2. A mounting for relays and the like comprising a supporting element having openings therein, members carried by said element provided with means to hold relays having various terminal arrangements, said members adjustable to position the terminals of the relays in registry with the openings in the supporting element, relays held by said members, guides carried by said relays, and a cover supported by said guides coöperating with said supporting element to inclose the relays supported thereby.

3. The combination with electrical apparatus of a cover therefor, a guide for the cover mounted on one side of the apparatus adapted to engage one wall of the cover, a spring member mounted on the opposite side of the apparatus adapted to exert pressure on the opposite wall of the cover, a recess in the cover, and a projection on the spring member adapted to engage the recess to lock the cover in position.

4. The combination with electrical apparatus of a cover therefor, a guide for the cover mounted on one side of the apparatus, a spring member mounted upon the opposite side of the apparatus adapted to hold the cover in engagement with the guide, a support for the apparatus adapted to coöperate with the cover to inclose the apparatus, a recess in the cover, a projection on the spring member adapted to engage the recess and hold the cover against the support.

5. The combination with a relay of a cover therefor, a guide for the cover secured to one side of the relay adapted to engage one inside wall of the cover and to prevent engagement of the cover with the contacts of the relay, a spring member mounted upon the other side of the relay adapted to engage the opposite inside wall of the cover, and a latch mechanism to hold the cover in position.

6. In combination, a support for electrical apparatus, a plurality of pieces of apparatus mounted thereon in a row, guides carried by the apparatus at the ends of the row, and a cover for the apparatus in said row supported by said guides.

In witness whereof I hereunto subscribe my name this 19th day of November, A. D. 1917.

WILLIAM O. BECK.